United States Patent
Williams et al.

(10) Patent No.: US 6,397,290 B1
(45) Date of Patent: May 28, 2002

(54) RECONFIGURABLE MEMORY WITH SELECTABLE ERROR CORRECTION STORAGE

(75) Inventors: Brett L. Williams, Eagle; Donald D. Baldwin, Boise, both of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/932,242

(22) Filed: Aug. 17, 2001

Related U.S. Application Data (63) Continuation of application No. 09/359,926, filed on Jul. 22, 1999, now Pat. No. 6,279,072.

(51) Int. Cl.[7] .......................... G06F 12/00; G06F 11/00
(52) U.S. Cl. ...................... 711/105; 711/154; 711/170; 714/48; 714/764
(58) Field of Search ................................ 711/100, 103, 711/105, 153, 154, 170; 714/704, 708, 723, 764, 48; 713/100

(56) References Cited

U.S. PATENT DOCUMENTS

| | | | |
|---|---|---|---|
| 4,884,271 A | 11/1989 | Concha et al. | 371/40.2 |
| 4,967,197 A | 10/1990 | Peng | 341/118 |
| 5,105,423 A | 4/1992 | Tanaka et al. | 371/5.5 |
| 5,159,465 A | 10/1992 | Maemura et al. | 358/405 |
| 5,233,653 A | 8/1993 | Katsurabayashi | 380/18 |
| 5,396,641 A | 3/1995 | Iobst et al. | 395/800 |
| 5,410,545 A | 4/1995 | Porter et al. | 371/21.6 |
| 5,579,488 A | 11/1996 | Ikeda | 395/280 |
| 5,818,847 A | 10/1998 | Zak | 371/5.1 |

*Primary Examiner*—Tuan V. Thai
(74) *Attorney, Agent, or Firm*—Dorsey & Whitney LLP (57) ABSTRACT

A memory structure includes a memory module divided into low order banks and high order banks. The low order banks are used as conventional memory. The high order banks are used as either conventional memory or ECC memory, depending upon routing of data. In one embodiment, data from the high order banks are routed through a primary multiplexer to a data bus when the high order banks are used as conventional memory. When the high order banks are used as ECC memory, data from the auxiliary section is routed through the primary multiplexer to an error correction circuit. A secondary multiplexer combines ECC bits from the auxiliary section of the module or a dedicated ECC memory on a motherboard. The auxiliary section thus supplements the onboard ECC memory to provide support for an effectively larger ECC memory for use with error intolerant applications that require error correction.

29 Claims, 5 Drawing Sheets

RECONFIGURABLE MEMORY WITH SELECTABLE ERROR CORRECTION STORAGE

CROSS-REFERENCE TO RELATED APPLICATION

This application is a continuation of U.S. patent application Ser. No. 09/359,926, filed Jul. 22, 1999, now U.S. Pat. No. 6,279,072.

TECHNICAL FIELD

The present invention relates to memory structures for computers, and more particularly, to error correction in computer memories.

BACKGROUND OF THE INVENTION

Semiconductor memory systems are subject to errors. That is, data retrieved from the memory does not always match data that was originally written to the memory. Such errors can be caused by stray alpha particles, damage to the memory devices or by a variety of operating conditions, such as power supply fluctuations, noise, etc. Regardless of the source, such errors are clearly undesirable. Consequently, most modern memory systems include error detection and/or error correction capabilities.

Typical approaches to detecting and correcting errors in memory rely upon some form of error correction code to identify and correct such data errors. Such error correction codes typically include a mathematical algorithm that is applied to the data to be checked and corrected, and additional error correction code ("ECC") bits. Usually, the ECC bits are stored in a separate memory dedicated to the ECC bits. The amount of memory dedicated to storing the ECC bits can be significant. For example, the memory overhead for the ECC bits can often exceed 10%.

The amount of ECC bits required can depend upon the type of error correction code being utilized. In some applications, very little or no error correction is desired. For example, in video games, occasional image data errors are unlikely to significantly affect the images perceived by a user. Rather than devote processor power to error correction calculations and memory to ECC bits, such applications largely ignore image data errors to increase the speed of play. Such applications will be referred to herein as error tolerant applications. Error tolerant applications typically use no error correction calculations or limited error correction algorithms that require little or no ECC memory.

Other applications can tolerate little or no data errors. For example, data errors can be extremely undesirable in accounting programs. Such applications will be referred to herein as error intolerant applications. Error intolerant applications usually utilize robust error correction algorithms requiring a substantial amount of ECC memory.

Typically, memory devices for storing ECC bits are segregated from memory devices for conventional data. For example, 144 pin 4-MB×64 double in-line memory module ("DIMM") not used to store ECC bits could be implemented using 16 4-MB×4 dynamic random access memories ("DRAMs"). However, the same data storage capacity plus the capacity to store ECC bits would require a 4-MB×72 DIMM implemented using 18 4-MB×4 DRAMs. Thus, implementing ECC requires two additional DRAMs.

One problem with such memory architectures is that they do not fully utilize the available memory capacity. For example, error tolerant applications do not need nor use the extra memory provided to store ECC bits. Thus, valuable memory capacity is left unused. In the above example, 11% of the DRAMs on the DIMM are wasted when the DIMM is not used to store ECC bits.

On the other hand, error intolerant applications require more memory and are often limited by the amount of available ECC memory. Consequently, the speed with which the application runs can be increased by increasing the amount of available ECC memory. Adding such memory can be costly. Moreover, adding such memory capacity increases the amount of unused memory in error tolerant applications.

SUMMARY OF THE INVENTION

A software or hardware controlled reconfigurable memory system includes an auxiliary section of one or more data banks that can be selectively utilized as conventional memory or ECC memory, depending upon the particular application. In one embodiment, the auxiliary section is part of a memory module that includes a primary section directly coupled to an output data bus for conventional memory uses. A primary multiplexer selectively couples the auxiliary section to either the output data bus or to an error checking circuit, depending upon the selected configuration of the system. If the system runs an error intolerant application employing a robust error correction algorithm, the auxiliary section is coupled to the error correction circuit to store ECC data for ECC calculations. In error tolerant applications not requiring error correction, the auxiliary section is coupled to the output data bus to supplement the conventional memory, thereby providing increased memory capacity and improving speed of the system.

One embodiment of the invention also includes a dedicated ECC memory, which could be located on the motherboard. A secondary multiplexer receives data from the dedicated ECC memory at one input and data from the primary multiplexer at a second input. The primary and secondary multiplexers are controlled by software or hardware to establish the amount of ECC memory being used. For error intolerant applications, the primary multiplexer is activated to couple data from the auxiliary section to one input of the secondary multiplexer. The secondary multiplexer is then activated to couple data from both the primary multiplexer and the dedicated ECC memory to the error correction circuit. Thus, the auxiliary section is used to supplement the dedicated ECC memory in error intolerant applications where additional ECC memory is desirable.

In one embodiment, the second input of the secondary multiplexer is coupled to a set of memory sockets on the motherboard. The secondary multiplexer selectively couples only those sockets containing memory chips to the error correction circuit. Also, the primary and secondary multiplexers are controlled to select an appropriate portion of the auxiliary section to supplement the dedicated ECC memory, according to the ECC data requirements of an application and the amount of available dedicated ECC memory.

In one embodiment, the auxiliary section is segmented into two sections. The first section is used to supplement the dedicated ECC memory from the motherboard. The second section is used as a supplement to the conventional memory. To accommodate the difference in word length caused by segmenting of the auxiliary section, the second section is "double-written" and "double-read" so that data is written to and read from the second section in two or more pieces. When reading the data, the two or more pieces are combined to form the complete written data.

DETAILED DESCRIPTION OF THE INVENTION

Figure 1:
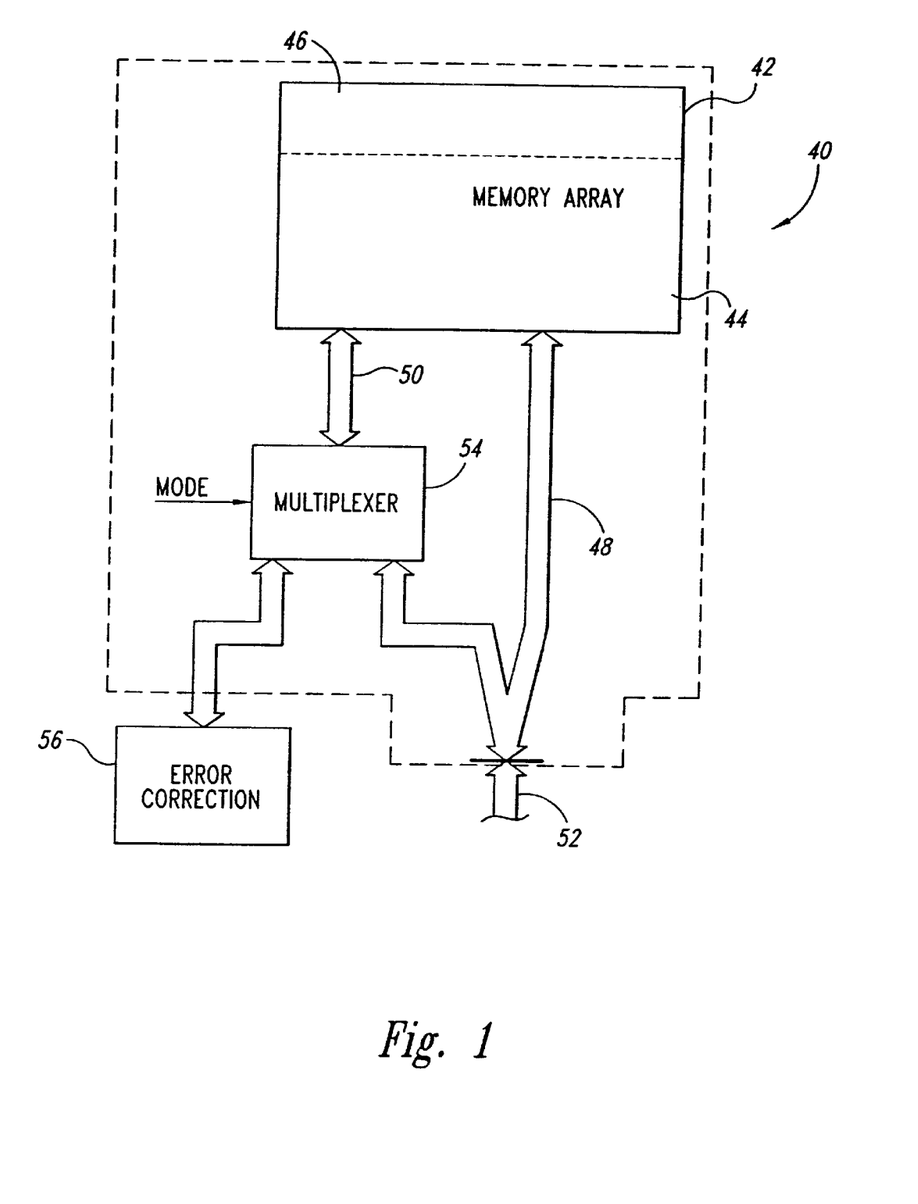
FIG. 1 is a block diagram of a memory system according to an embodiment of the invention on which a memory device is selectively coupled to either an output data bus or to an error correction circuit by a primary multiplexer.

As shown in FIG. 1, a memory system 40 according to an embodiment of the invention includes as its central storage element a memory array 42 having at least one low-order bank 44 and at least one high-order bank 46. The memory array 42 is formed from one or more integrated memory devices. The devices may be any suitable type of memory device, such as dynamic random access memories (DRAMs), static RAMs (SRAMs), or nonvolatile memory devices. The memory devices may also be synchronous or asynchronous, or some other variety of memory device.

Data that are to be written to and read from the memory array 42 are coupled to and from the array 42 along a 64-bit primary data path 48 and a 64-bit auxiliary data path 50, respectively. The primary data path 48 extends directly from the low order banks 44 to a data bus 52. Although the embodiment of FIG. 1 uses 64-bit buses 48, 50, it will be better understood that higher or lower capacity buses may be used.

The auxiliary data path 50 is coupled to a primary multiplexer 54, which is a 64-bit, 1-to-2 multiplexer. In response to a mode select input MODE, the primary multiplexer 54 selectively couples data from the high order banks 46 to either the data bus 52 or to an error correction circuit 56. The high order banks 46 can therefore provide storage for ECC bits or can provide storage to supplement the primary section 44.

Figure 2:
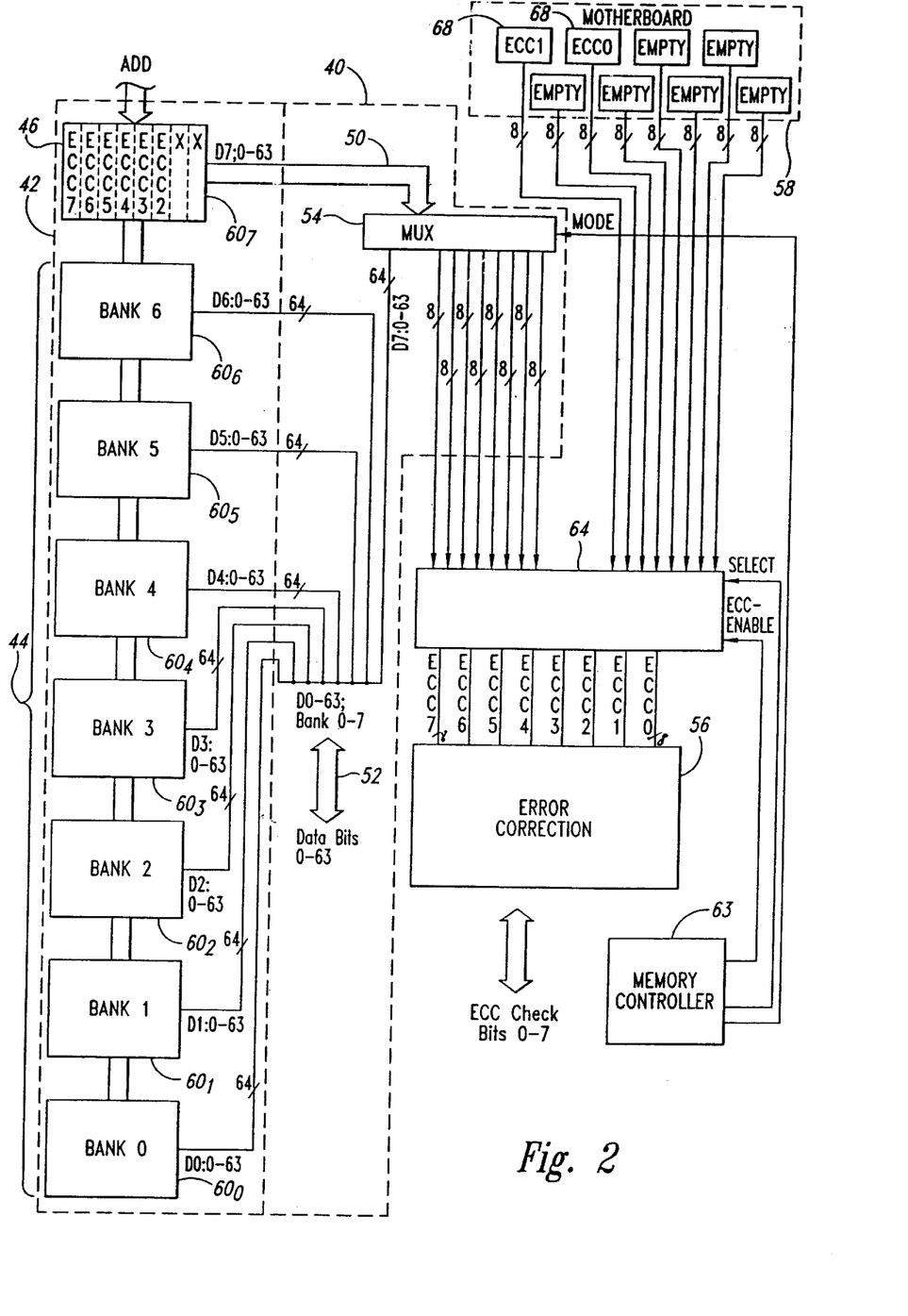
FIG. 2 is a more detailed block diagram of the memory system of FIG. 1 coupled to a memory controller.

FIG. 2 shows the memory system 40 of FIG. 1 in greater detail in conjunction with a separate error correction memory (ECC memory) 58. In this embodiment, the memory array 42 includes eight memory banks $60_0$–$60_7$ where the first seven banks $60_0$–$60_6$ correspond to the low order banks of FIG. 1 and the eighth memory bank $60_7$ corresponds to the high order bank 46 of FIG. 1. The output of the eighth bank $60_7$ is input to the primary multiplexer 54 through the auxiliary data path 50 while the outputs of the first seven banks $60_0$–$60_6$ are connected directly to the data bus 52.

Switching of the primary multiplexer 54 is controlled by a memory controller 63 through a mode signal MODE, in response to either software or hardware commands. Depending upon the state of the mode signal MODE, the primary multiplexer 54 couples data from the eighth data bank $60_7$ to either the data bus 52 or to a secondary multiplexer 64. If the mode signal MODE is high, the primary multiplexer 54 directs data to the data bus 52. If the mode signal MODE is low, the primary multiplexer 54 directs data to the secondary multiplexer 64.

Like the primary multiplexer 54, the secondary multiplexer 64 includes eight, 8-bit 2-to-1 multiplexers, rather than eight, 8-bit 1-to-2 multiplexers. Thus, the 64 outputs of the primary multiplexer 54 are coupled to a first set of 64 inputs of the secondary multiplexer 64. The second set of 64 inputs of the secondary multiplexer 64 is coupled to the ECC memory 58. When enabled by the mode signal MODE and by an error correction enable signal ECCENABLE, the secondary multiplexer 64 couples one of eight 8-bit bytes of ECC data to the error correction circuit 56 as determined by a SELECT input from the memory controller. The first two 8-bit bytes of ECC data are supplied by respective ECC chips 68 in the ECC memory 58. The remaining six 8-bit bytes are supplied by the high order banks 46 through the primary multiplexer 54.

Figure 5:
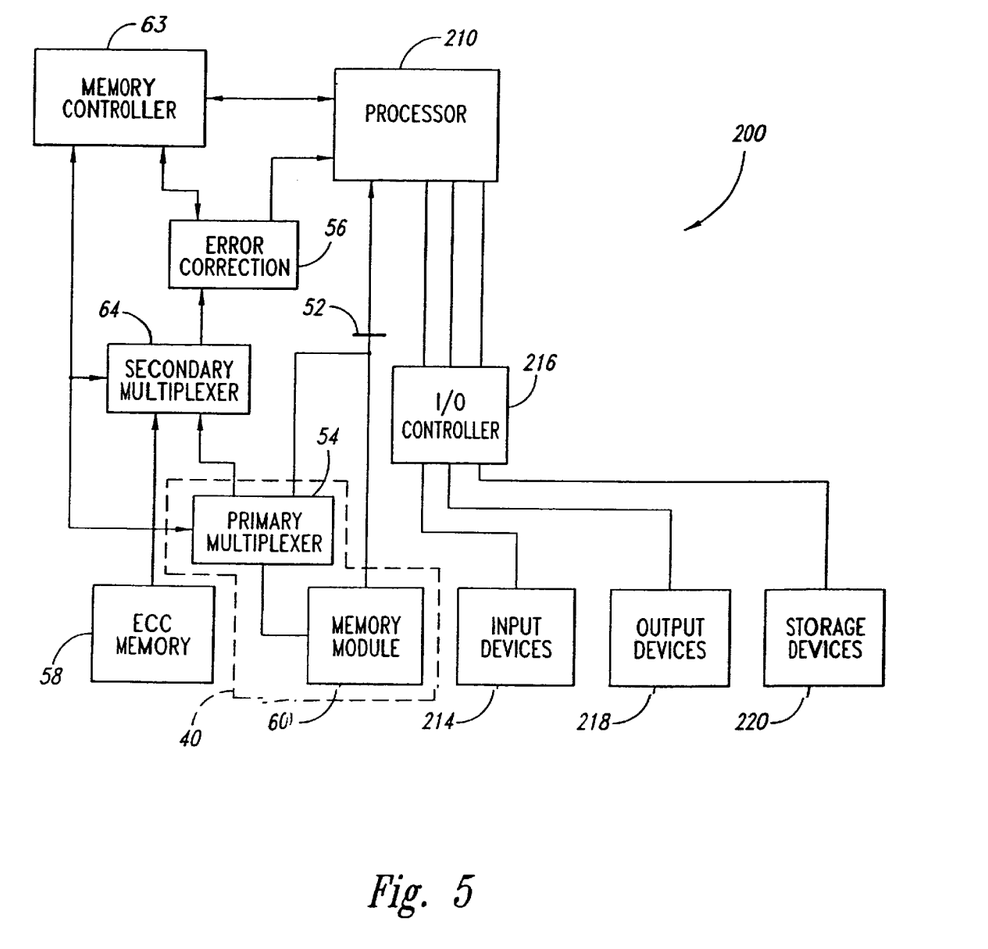
FIG. 5 is a block diagram of a computer system according to one embodiment of the invention including input and output devices, a processor, and the memory system of FIG. 1.

The error correction circuit 56 operates on the 8 bits of ECC data $ECC_0$–$ECC_7$ to identify and correct errors according to conventional error correction techniques, such as Hamming code or similar correction algorithms. The error correction circuit 56 may be implemented as dedicated hardware or as a software program in a processor 210 (FIG. 5).

In operation, the memory system 40 can operate in either an error tolerant mode or an error intolerant mode. In the error tolerant mode, the primary multiplexer 54 couples the high order bank $60_7$ to the data bus 52 so that all 8 banks $60_0$–$60_7$ are used for storing data. In the error intolerant mode, the primary multiplexer 54 couples the high order bank $60_7$ to the secondary multiplexer 64, the secondary multiplexer 64 then couples the high order bank $60_7$ to the error correction circuit 56. Alternatively, the secondary multiplexer 64 can couple the ECC memory 68 to the error correction circuit 56. In either case, when data are written to the low order banks $60_0$–$60_6$, 8 ECC check bits are applied to the error correction circuit 56. The error correction circuit 56 then couples 64 bit s to the high order banks $60_7$ through the secondary multiplexer 64 and the primary multiplexer 54.

During a read operation, data are coupled from the low order banks $60_0$–$60_6$ to the data bus 52, and corresponding ECC data are coupled from the high order bank $60_7$ through the multiplexer 54, 64 to the error correction circuit 56. The error correction circuit 56 then checks the 8 ECC bits in a conventional manner to detect and correct errors in the data coupled to the data bus 52.

Figure 3:
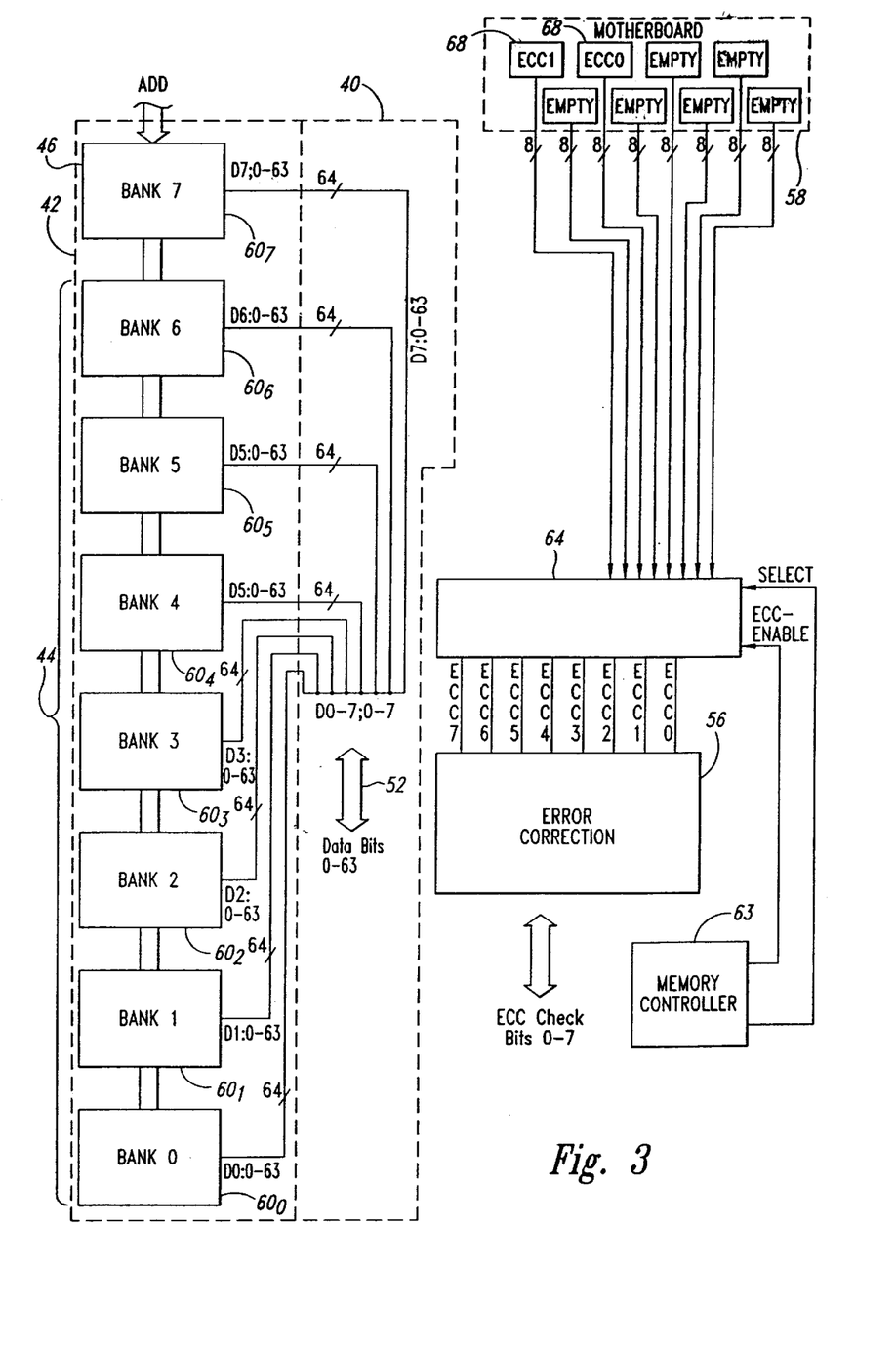
FIG. 3 is a block diagram of another embodiment of the memory system of FIG. 1.

FIG. 3 shows the system of FIG. 2 where the error correction implementation is less robust, ie., ECC data is supplied only by the ECC memory 58 on the mother board. Consequently, the two ECC chips 68 in the ECC memory 58 provide the ECC data for banks $60_0$ and $60_1$, only. The secondary multiplexer 64 thus outputs only the ECC data for the banks $60_0$ and $60_1$ to the error correction circuit 56. More memory chips would need to be added to ECC memory 58 in order to support more databanks $60_2$–$60_6$.

Figure 4:
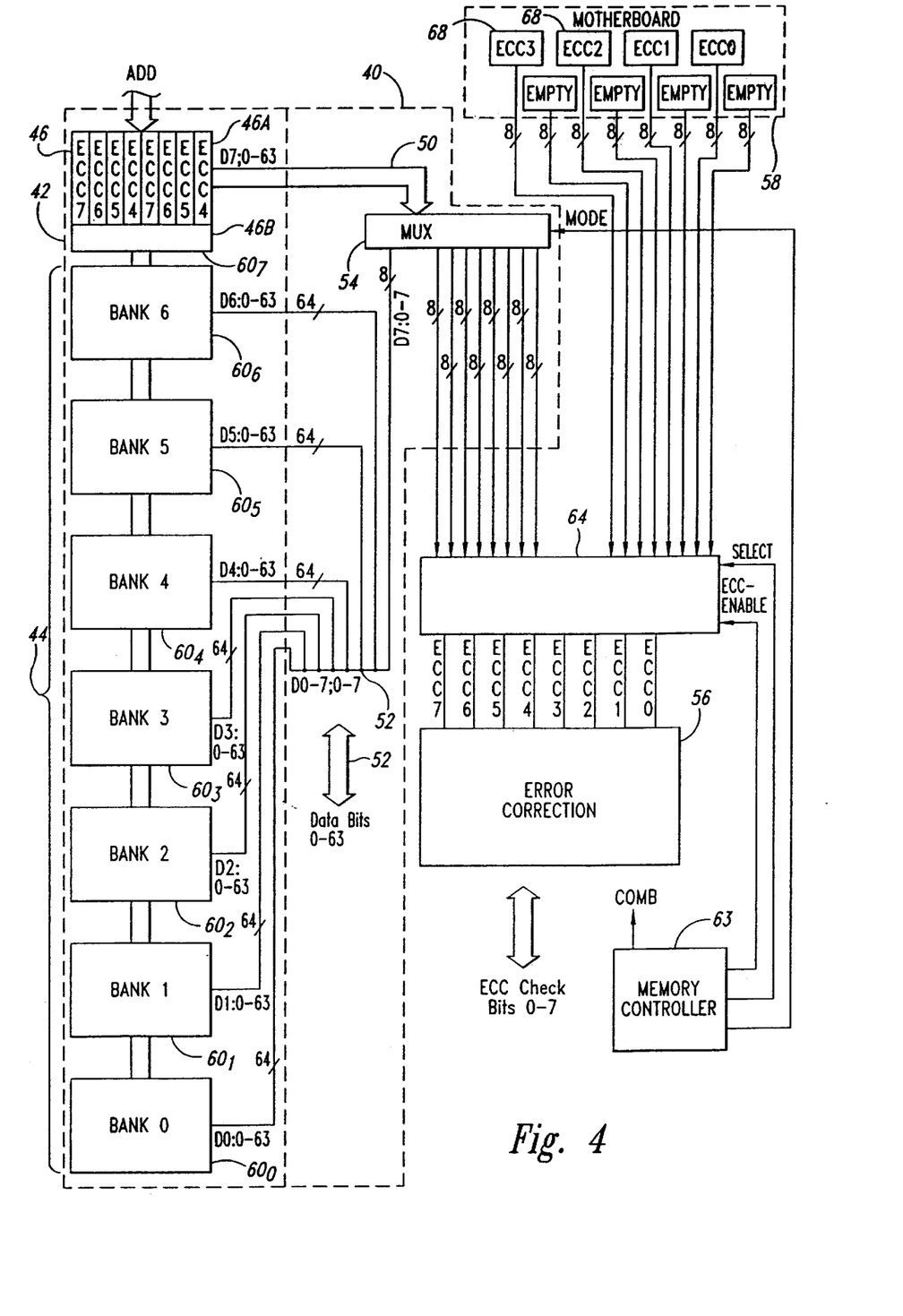
FIG. 4 is a block diagram of still another embodiment of the memory system of FIG. 1.

FIG. 4 shows another embodiment of the invention in which the ECC memory 58 includes four ECC chips 68 and which uses an error correction algorithm involving 8-bits of ECC data $ECC_0$–$ECC_7$. The four ECC chips 68 supply the ECC data for banks $60_0$–$60_3$. Therefore, only half of the high order bank $60_7$ is used for error correction of banks $60_4$–$60_7$, leaving half of the high order bank $60_7$ free for conventional memory use. Instead of leaving half of the high order bank $60_7$ unused, the high order bank $60_7$ is broken into two subsections 46A, 46B where the first subsection 46A contains ECC data and the second subsection 46B is used as conventional memory to supplement the low order banks $60_0$–$60_6$. The first subsection 46A provides the second four 8-bit bytes of error correction data used for memory bank $60_0$–$60_3$ to the secondary multiplexer 64 through the primary multiplexer 54 in a similar fashion to that described above for FIG. 2. The secondary multiplexer 64 selects either the onboard ECC data for banks $60_4$–$60_7$ or the auxiliary ECC data for banks $60_0$–$60_3$.

The second subsection 46B of the high order bank $60_7$ is not wasted. Instead, the second subsection 46B provides data to the data bus 52 through the primary multiplexer 54. One skilled in the art will recognize that the second subsection 46B will only be comprised of a memory bank that is half the depth of the banks $60_0$–$60_6$. Since the high order bank $60_7$ cannot both supply data and ECC bits simultaneously, the on board ECC memory 58 must supply the ECC data for the second subsection of the high order bank $60_7$.

FIG. 5 is a block diagram of a computer system 200 that uses one of the embodiments of FIGS. 2–4. The computer system 200 includes a processor 210 for performing computer functions, such as executing software to perform desired calculations and tasks. The processor 210 accesses the memory module 40 and ECC memory 58 through the data bus 52 by activating the memory controller 63 which, in turn, controls the multiplexers 54, 64. The memory module 40 and the ECC memory 58 are preferably mounted at separate locations within the computer system 200 with the ECC memory 58 being mounted to a common board with the processor 210. The memory module 40 and ECC memory 58 are coupled to the processor 210 through the data bus 52. The processor 210 is also coupled to the error correction circuit 56 to receive error detection and correction information that the processor 210 uses to control the memory controller 63. One or more input devices 214, such as a keypad or a mouse, are coupled to the processor 210 through an I/O controller 216 and allow an operator (not shown) to manually input data thereto. One or more output devices 218 are coupled to the processor 210 through the I/O controller to provide to the operator data generated by the processor 210 or retrieved from the memory module 40. Examples of output devices 218 include a printer and a video display unit. One or more mass data storage devices 220 are preferably coupled to the processor 210 through the I/O controller 216 to store data in or retrieve data from the storage device 220. Examples of the storage devices 220 include disk drives and compact disk read-only memories (CD-ROMs).

While the present invention has been described herein by way of exemplary embodiments, various modifications may be made without departing from the scope of the invention. For example, the number of ECC chips 68 in the ECC memory 58 may be larger or smaller. Also, the secondary multiplexer 64 can be configured to vary the multiplexing of the ECC data in response to the enable signal ECC ENABLE, so that the combination of bits from the ECC memory 58 and auxiliary section 46 can be controlled remotely by the memory controller 63. Additionally, the high order bank 46 may include more than one bank of the memory array 42. Further, the memory array 42 may include fewer or more than eight banks. And, the ECC memory 58 can be located off the motherboard in some applications. Moreover, the error correction circuit 56 and/or the memory controller 63 can be implemented in whole or in part by the processor 210 in response to software. Also, the number of bits in each bank or on the data busses may be fewer than or more than the 64-bit bus structure described herein. Accordingly, the invention is not limited except as by the appended claims.

What is claimed is:

1. A memory control system for a computer system having a memory array divisible into a plurality of memory partitions, comprising:

a memory controller responsive to an error intolerance signal for selectively assigning each of the memory partitions as error tolerant memory partitions, error intolerant memory partitions, or error correction code partitions for error intolerant memory partitions;

a memory controller responsive to an error intolerance signal for selectively assigning each of the memory partitions as error tolerant memory partitions, error intolerant memory partitions, or error correction code partitions for error intolerant memory partitions;

an error correction code unit for generating and processing sets of error correction codes for data stored in each of the error intolerant memory partitions; and a data routing system operably connected to the memory array and the error correction code unit for routing the sets of error correction codes for the data stored in the error intolerant memory partitions to the corresponding error correction code partitions and retrieving the sets of error correction codes for the data stored in the error intolerant memory partitions from the corresponding error correction code partitions.

2. The memory control system of claim 1 further comprising an error correction code memory bank operably connected to the data routing system, the error correction code memory bank comprising a plurality of error correction code memory bank partitions.

3. The memory control system of claim 2 wherein the memory controller selectively assigns either a corresponding error correction code partition or a corresponding error correction code memory bank partition for storing the sets of error correction codes for each of the error intolerant memory partitions.

4. The memory control system of claim 3 wherein the data routing system selectively routes the set of error correction codes for the data stored in the error intolerant conventional memory partition to and from the corresponding error correction code partition or the corresponding error correction code memory bank partition.

5. The memory control system of claim 4 wherein the data routing system comprises:

a data bus;

a first switching circuit having a first data port coupled to the memory partitions assigned as error correction code partitions, a second data port coupled to the data bus, a third data port coupled to the error correction unit, and a mode select input, the switching circuit responsive to a first mode select signal to couple the first data port to the second data port, and responsive to a second mode select signal to couple the first data port to the third data port; and a second switching circuit having a first data port coupled to the third data port of the first switching circuit, a second data port coupled to the error correction code memory bank, a third data port coupled to the error correction unit, and a control input, the second switching circuit responsive to a first control signal to couple the first data port to the third data port, and responsive to a second control signal to couple the second data port to the third data port.

6. The memory control system of claim 4 wherein the data routing system comprises:

a first multiplexer having a first data port coupled to the memory partitions assigned as error correction code partitions, a second data port coupled to the data bus, a third data port, and a control input, the first multiplexer responsive to a first control signal applied to the control input to couple the first data port to the second data port, and responsive to a second control signal to couple the first data port to the third data port; and a second multiplexer having a first data port coupled to the third data port of the first multiplexer, a second data port coupled to the error correction code memory bank, a third data port coupled to the error correction unit, and a control input, the second multiplexer responsive to a third control signal applied to the control input to couple the first data port to the third data port, and responsive to a fourth control signal to couple the second data port to the third data port.

7. The memory control system of claim 5 wherein the data ports of the first switching circuit comprise a first plurality of sets of data lines, and the second data port of the second switching circuit comprises a second plurality of sets of data lines, the second switching circuit responsive to the first control signal to couple one of the sets in the first plurality of sets of data lines to the error correction unit, and responsive to the second control signal to couple one of the sets in the second plurality of sets of data lines to the error correction unit.

8. A memory for a computer system, comprising:

a memory array divisible into a plurality of memory partitions;

a memory controller responsive to an error intolerance signal for selectively assigning each of the memory partitions as error tolerant memory partitions, error intolerant memory partitions, or error correction code partitions for corresponding error intolerant memory partitions;

an error correction code unit for generating and processing sets of error correction codes for data stored in each of the error intolerant memory partitions; and a data routing system operably connected to the memory array and the error correction code unit for routing the sets of error correction codes for the data stored in the error intolerant memory partitions to the corresponding error correction code partitions and retrieving the set of error correction codes for the data stored in the error intolerant memory partitions from the corresponding error correction code partitions.

9. The memory of claim 8 further comprising an error correction code memory bank operably connected to the data routing system, the error correction code memory bank comprising a plurality of error correction code bank partitions.

10. The memory of claim 9 wherein the memory controller selectively assigns either a corresponding error correction code partition or a corresponding error correction code memory bank partition for storing the sets of error correction codes for each of the error intolerant memory partitions.

11. The memory of claim 10 wherein the data routing system selectively routes the set of error correction codes for the data stored in the error intolerant conventional memory partition to and from the corresponding error correction code partition or the corresponding error correction code memory bank partition.

12. The memory of claim 11 wherein the data routing system comprises:

a data bus;

a first switching circuit having a first data port coupled to the memory partitions assigned as error correction code partitions, a second data port coupled to the data bus, a third data port coupled to the error correction unit, and a mode select input, the switching circuit responsive to a first mode select signal to couple the first data port to the second data port, and responsive to a second mode select signal to couple the first data port to the third data port; and a second switching circuit having a first data port coupled to the third data port of the first switching circuit, a second data port coupled to the error correction code memory bank, a third data port coupled to the error correction unit, and a control input, the second switching circuit responsive to a first control signal to couple the first data port to the third data port, and responsive to a second control signal to couple the second data port to the third data port.

13. The memory of claim 11 wherein the data routing system comprises:

a first multiplexer having a first data port coupled to the memory partitions assigned as error correction code memory bank partitions, a second data port coupled to the data bus, a third data port, and a control input, the first multiplexer responsive to a first control signal applied to the control input to couple the first data port to the second data port, and responsive to a second control signal to couple the first data port to the third data port; and a second multiplexer having a first data port coupled to the third data port of the first multiplexer, a second data port coupled to the error correction code memory bank, a third data port coupled to the error correction unit, and a control input, the second multiplexer responsive to a third control signal applied to the control input to couple the first data port to the third data port, and responsive to a fourth control signal to couple the second data port to the third data port.

14. The memory of claim 12 wherein the data ports of the first switching circuit comprise a first plurality of sets of data lines, and the second data port of the second switching circuit comprises a second plurality of sets of data lines, the second switching circuit responsive to the first control signal to couple one of the sets in the first plurality of sets of data lines to the error correction unit, and responsive to the second control signal to couple one of the sets in the second plurality of sets of data lines to the error correction unit.

15. A computer system, comprising:

a data bus;

a plurality of peripheral devices;

a memory system having a memory array divisible into a plurality of memory partitions coupled to the data bus;

a memory controller responsive to an error intolerance signal for selectively assigning each of the memory partitions as error tolerant memory partitions, error intolerant memory partitions, and selectively able to assign error correction code partitions for corresponding error intolerant memory partitions an error correction code unit including a memory correction port, the error correction code unit generating and processing sets of error correction codes for data stored in each of the error intolerant memory partitions;

a processor coupled to the plurality of peripheral devices, the memory correction port and the data bus, the processor structured to couple data to or from the data bus and a corresponding error correction code to or from the memory correction port, respectively; and a data routing system operably connected to the memory array and the error correction code unit for routing the sets of error correction codes for the data stored in the error intolerant memory partitions to the corresponding error correction code partitions and retrieving the set of error correction codes for the data stored in the error intolerant memory partitions from the corresponding error correction code partitions.

16. The computer system of claim 15 further comprising an error correction code memory bank operably connected to the data routing system, the error correction code memory bank comprising a plurality of error correction code memory bank partitions.

17. The computer system of claim 16 wherein the memory controller selectively assigns either a corresponding error correction code partition or a corresponding error correction code memory bank partition for storing the sets of error correction codes for each of the error intolerant memory partitions.

18. The computer system of claim 17 wherein the data routing system selectively routes the set of error correction codes for the data stored in the error intolerant conventional memory partition to and from the corresponding error correction code partition or the corresponding error correction code memory bank partition.

19. The computer system of claim 18 wherein the data routing system comprises:
   a first switching circuit having a first data port coupled to the memory partitions assigned as error correction code partitions, a second data port coupled to the data bus, a third data port coupled to the error correction unit, and a mode select input, the switching circuit responsive to a first mode select signal to couple the first data port to the second data port, and responsive to a second mode select signal to couple the first data port to the third data port; and
   a second switching circuit having a first data port coupled to the third data port of the first switching circuit, a second data port coupled to the error correction code memory bank, a third data port coupled to the error correction unit, and a control input, the second switching circuit responsive to a first control signal to couple the first data port to the third data port, and responsive to a second control signal to couple the second data port to the third data port.

20. The computer system of claim 18 wherein the data routing system comprises:
   a first multiplexer having a first data port coupled to the memory partitions assigned as error correction code memory bank partitions, a second data port coupled to the data bus, a third data port, and a control input, the first multiplexer responsive to a first control signal applied to the control input to couple the first data port to the second data port, and responsive to a second control signal to couple the first data port to the third data port; and
   a second multiplexer having a first data port coupled to the third data port of the first multiplexer, a second data port coupled to the error correction code memory bank, a third data port coupled to the error correction unit, and a control input, the second multiplexer responsive to a third control signal applied to the control input to couple the first data port to the third data port, and responsive to a fourth control signal to couple the second data port to the third data port.

21. The computer system of claim 19 wherein the data ports of the first switching circuit comprise a first plurality of sets of data lines, and the second data port of the second switching circuit comprises a second plurality of sets of data lines, the second switching circuit responsive to the first control signal to couple one of the sets in the first plurality of sets of data lines to the error correction unit, and responsive to the second control signal to couple one of the sets in the second plurality of sets of data lines to the error correction unit.

22. A method of storing and retrieving data in a memory system operable in either an error tolerant mode or an error intolerant mode, the method comprising:
   dividing a memory array associated with the memory system into a plurality of memory partitions;
   assigning each of the memory partitions as error tolerant memory partitions, error intolerant memory partitions, or error correction code partitions for corresponding error intolerant memory partitions;
   generating and processing sets of error correction codes for data stored in each of the error intolerant memory partitions; and
   routing the sets of error correction codes for the data stored in the error intolerant memory partitions to the corresponding error correction code partitions and retrieving the sets of error correction codes for the data stored in the error intolerant memory partitions from the corresponding error correction code partitions.

23. The method of claim 22 further comprising operably connecting to the memory system an error correction code memory bank comprising a plurality of error correction code memory bank partitions.

24. The method of claim 23 further comprising selectively assigning either a corresponding error correction code partition or a corresponding error correction code memory bank partition for storing the sets of error correction codes for each of the error intolerant memory partitions.

25. The method of claim 24 further comprising selectively routing the set of error correction codes for the data stored in the error intolerant conventional memory partition to and from the corresponding error correction code partition or the corresponding error correction code memory bank partition.

26. A method of storing and retrieving data in a memory system operable in either an error tolerant mode or an error intolerant mode, the method comprising:
   dividing a memory array associated with the memory system into a plurality of memory partitions;
   assigning each of the memory partitions as error tolerant memory partitions, error intolerant memory partitions, or error correction code partitions for corresponding error intolerant memory partitions;
   generating a set of error correction codes for data residing in an error intolerant memory partition;
   storing the set of error correction codes for the data residing in the error intolerant memory partition in a corresponding error correction code partition;
   reading the set of error correction codes stored in the corresponding error correction code partition when the data residing in the error intolerant memory partition is read;
   determining from the set of error correction codes stored in the corresponding error correction code partition if the data residing in the error intolerant memory partition contains errors; and
   correcting the errors determined in the data residing in the error intolerant memory partition.

27. The method of claim 26 further comprising operably connecting an error correction code memory bank to the memory system and dividing the error correction code memory banks into error correction code memory bank partitions.

28. The method of claim 27 further comprising storing the set of error correction codes for the data residing in the error intolerant memory partition in either a corresponding error correction code partition or an error code correction memory bank partition.

29. The method of claim 28 further comprising reading of the set of error correction codes for data residing in the error intolerant memory partition from either the corresponding error code correction partition or the error code correction memory bank partition where the set of error correction codes for the data residing in the error intolerant memory partition was stored.

* * * * *